(12) United States Patent
Choi et al.

(10) Patent No.: US 9,338,633 B2
(45) Date of Patent: *May 10, 2016

(54) WI-FI SERVICE METHOD AND SYSTEM FOR WI-FI DEVICES

(75) Inventors: Jong Mu Choi, Gunpo-si (KR); You Na Lee, Suwon-si (KR); Jhong Il Kim, Suwon-si (KR); Jun Ho Lee, Yongin-si (KR); Jung Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

This patent is subject to a terminal disclaimer.

(21) Appl. No.: 13/107,489

(22) Filed: May 13, 2011

(65) Prior Publication Data

US 2011/0280233 A1 Nov. 17, 2011

(30) Foreign Application Priority Data

May 14, 2010 (KR) .................. 10-2010-0045186

(51) Int. Cl.
*H04W 8/00* (2009.01)
*H04L 29/06* (2006.01)
*H04W 12/06* (2009.01)

(52) U.S. Cl.
CPC ........... *H04W 8/005* (2013.01); *H04L 63/0853* (2013.01); *H04W 12/06* (2013.01); *H04L 63/20* (2013.01)

(58) Field of Classification Search
CPC .... H04W 8/005; H04W 8/22; H04L 41/5048; H04L 29/08648; H04L 67/1068
USPC ................... 370/338; 709/225, 227
See application file for complete search history.

(56) References Cited

U.S. PATENT DOCUMENTS

| 6,438,590 B1* | 8/2002 | Gartner et al. ................ 709/219 |
| 2004/0205246 A1* | 10/2004 | Park .............................. 709/245 |
| 2005/0078644 A1 | 4/2005 | Tsai et al. |
| 2006/0094359 A1* | 5/2006 | Kim ............................ 455/41.2 |

(Continued)

FOREIGN PATENT DOCUMENTS

| JP | 2007-053728 A | 3/2007 |
| JP | 2008-092186 A | 4/2008 |

OTHER PUBLICATIONS

"Wi-Fi Protected Setup Specification", Version 1.0h, Dec. 2006, pp. 1-110.*

*Primary Examiner* — Scott M Sciacca
(74) *Attorney, Agent, or Firm* — Jefferson IP Law, LLP

(57) ABSTRACT

A Wireless-Fidelity (Wi-Fi) service method and system are provided. A beacon message and probe response message may contain a service information field storing device information. Wi-Fi devices can exchange information on supported functions with each other and one Wi-Fi device may identify functions supported by another Wi-Fi device. Hence, a Wi-Fi connection can be set up through automatic provisioning. The method includes receiving, by a first Wi-Fi device in non-Access Point (AP) mode, messages from nearby Wi-Fi devices operating in AP mode, analyzing a service information field of each received message, determining a second Wi-Fi device that is manufactured by the same manufacturer as the first Wi-Fi device and is capable of supporting a requested service, establishing a connection with the second Wi-Fi device through Wi-Fi Protected Setup (WPS) based on automatic provision, and sending data associated with the requested service to the second Wi-Fi device for a Wi-Fi service.

11 Claims, 9 Drawing Sheets

(56) References Cited

U.S. PATENT DOCUMENTS

| | | |
|---|---|---|
| 2007/0072651 A1 | 3/2007 | Suzuki et al. |
| 2007/0141988 A1* | 6/2007 | Kuehnel et al. .............. 455/41.2 |
| 2008/0081561 A1 | 4/2008 | Kato et al. |
| 2008/0141347 A1* | 6/2008 | Kostiainen et al. ................ 726/4 |
| 2008/0160914 A1* | 7/2008 | McRae et al. ................ 455/41.2 |
| 2008/0172491 A1* | 7/2008 | Chhabra et al. ............... 709/227 |
| 2008/0299909 A1* | 12/2008 | Sakai .......................... 455/66.1 |
| 2009/0029691 A1* | 1/2009 | Shen et al. .................... 455/418 |
| 2009/0104875 A1 | 4/2009 | Naniyat |
| 2009/0271709 A1* | 10/2009 | Jin et al. ......................... 715/739 |
| 2010/0010899 A1* | 1/2010 | Lambert et al. ............ 705/14.58 |
| 2010/0165879 A1* | 7/2010 | Gupta et al. ................... 370/254 |
| 2010/0322213 A1* | 12/2010 | Liu et al. ....................... 370/338 |
| 2011/0075589 A1* | 3/2011 | Bradley et al. ................ 370/254 |
| 2011/0119491 A1* | 5/2011 | Nocera ......................... 713/170 |
| 2011/0142014 A1* | 6/2011 | Banerjee et al. ............. 370/338 |
| 2011/0149806 A1 | 6/2011 | Verma et al. |
| 2011/0151840 A1* | 6/2011 | Gong et al. ................ 455/414.1 |

* cited by examiner

FIG. 10A

| Category | ID Value | Sub Category | ID Value |
|---|---|---|---|
| Computer | 1 | PC | 1 |
| | | Server | 2 |
| | | Media Center | 3 |
| | | Ultra-mobile PC | 4 |
| | | Notebook | 5 |
| | | Desktop | 6 |
| | | MID (Mobile Internet Device) | 7 |
| | | Netbook | 8 |
| Input Device | 2 | Keyboard | 1 |
| | | Mouse | 2 |
| | | Joystick | 3 |
| | | Trackball | 4 |
| | | Gaming controller | 5 |
| | | Remote | 6 |
| | | Touchscreen | 7 |
| | | Biometric reader | 8 |
| | | Barcode reader | 9 |
| Printers, Scanners, Faxes and Copiers | 3 | Printer or Print Server | 1 |
| | | Scanner | 2 |
| | | Fax | 3 |
| | | Copier | 4 |
| | | All-in-one (Printer, Scanner, Fax, Copier) | 5 |
| Camera | 4 | Digital Still Camera | 1 |
| | | Video Camera | 2 |
| | | Web Camera | 3 |
| | | Security Camera | 4 |
| Storage | 5 | NAS | 1 |
| Network Infrastructure | 6 | AP | 1 |
| | | Router | 2 |
| | | Switch | 3 |
| | | Gateway | 4 |
| Displays | 7 | Television | 1 |
| | | Electronic Picture Frame | 2 |
| | | Projector | 3 |
| | | Monitor | 4 |

FIG. 10B

| Category | ID Value | Sub Category | ID Value |
|---|---|---|---|
| Multimedia Devices | 8 | DAR | 1 |
| | | PVR | 2 |
| | | MCX | 3 |
| | | Set-top box | 4 |
| | | Media Server/Media Adapter/Media Extender | 5 |
| | | Portable Video Player | 6 |
| Gaming Devices | 9 | Xbox | 1 |
| | | Xbox360 | 2 |
| | | Playstation | 3 |
| | | Game Console/Game Console Adapter | 4 |
| | | Portable Gaming Device | 5 |
| Telephone | 10 | Windows Mobile | 1 |
| | | Phone – single mode | 2 |
| | | Phone – dual mode | 3 |
| | | Smartphone – single mode | 4 |
| | | Smartphone – dual mode | 5 |
| Audio Devices | 11 | Audio tuner/receiver | 1 |
| | | Speakers | 2 |
| | | Portable Music Player (PMP) | 3 |
| | | Headset (headphones + microphone) | 4 |
| | | Headphones | 5 |
| | | Microphone | 6 |
| Others | 255 | | |

WI-FI SERVICE METHOD AND SYSTEM FOR WI-FI DEVICES

PRIORITY

This application claims the benefit under 35 U.S.C. §119(a) of a Korean patent application filed on May 14, 2010 in the Korean Intellectual Property Office and assigned Serial No. 10-2010-0045186, the entire disclosure of which is hereby incorporated by reference.

BACKGROUND OF THE INVENTION

1. Field of the Invention

The present invention relates to Wireless-Fidelity (Wi-Fi) devices. More particularly, the present invention relates to a method and system for providing Wi-Fi services wherein a Wi-Fi device can identify functions supported by another Wi-Fi device by exchanging information on supported functions to thereby provide a desired Wi-Fi service.

2. Description of the Related Art

In recent years, advances in wireless technology have led to the replacement of wired networks with wireless networks. In particular, wireless networks can address the mobility limitations of wired networks. In addition, rapid advances in information and communication and semiconductor technologies have enabled widespread popularization of mobile terminals. More particularly, high-end mobile terminals have evolved into mobile convergence devices supporting heterogeneous functions originating from distinct fields. For example, mobile communication terminals may support not only regular communication functions related to voice calls and messages but also other functions related to mobile broadcast reception via Digital Multimedia Broadcasting (DMB) or Digital Video Broadcasting (DVB), music playback using an Moving Picture Experts Group (MPEG)-1 or MPEG-2 audio layer 3 (MP3) player, photography and Wireless-Fidelity (Wi-Fi) access.

Wireless Local Area Networks (WLANs) are closely related to Wi-Fi services, and enable mobile terminals and laptop computers in the vicinity of Access Points (APs) to access the Internet. WLANs can be used as open networks to provide high-speed data services to schools, airports, hotels and offices.

Wi-Fi capable mobile terminals have experienced inconvenience in connection setup, which is essential to Wi-Fi services. Wi-Fi Protected Setup (WPS) has been developed so that Wi-Fi capable mobile terminals can set up a secure wireless channel without complex setup details. That is, WPS enables Wi-Fi devices to set up a secure connection by actuating a specific button or entering a Personal Identification Number (PIN) code.

However, the WPS function is not in widespread use and general users are unfamiliar with the WPS function. The WPS function requires actuation of an assigned button or manual entry of a PIN code. In addition to mobile convergence functions, a new procedure of Wi-Fi connection setup may increase the burden of the user of a mobile terminal.

SUMMARY OF THE INVENTION

Aspects of the present invention are to address at least the above-mentioned problems and/or disadvantages and to provide at least the advantages described below. Accordingly, an aspect of the present invention is to provide a method and system that enable Wireless-Fidelity (Wi-Fi) devices to exchange information on supported functions with each other.

Another aspect of the present invention is to provide a control method that realizes a Wi-Fi service by automatically setting up, in response to invocation of a Wi-Fi based application in one Wi-Fi device, a connection with another Wi-Fi device capable of supporting the function of the executed application.

Yet another aspect of the present invention is to provide a method and system wherein, for execution of a Wi-Fi based application realizing a specific Wi-Fi service, one Wi-Fi device can utilize information on supported functions provided by other Wi-Fi devices to rapidly select another Wi-Fi device capable of supporting the function of the application and set up a connection with the selected Wi-Fi device.

Still another aspect of the present invention is to provide a method and system that realize a satisfactory Wi-Fi service environment in terms of user convenience by allowing Wi-Fi devices to exchange information on supported functions with each other.

Yet another aspect of the present invention is to provide a method and system that enable the user to utilize a Wi-Fi device in an easy and convenient manner by providing information on functions supported by available Wi-Fi devices in advance.

In accordance with an aspect of the present invention, a method for providing Wi-Fi services is provided. The method includes receiving, by a first Wi-Fi device in non-Access Point (AP) mode, messages from nearby Wi-Fi devices operating in AP mode, analyzing a service information field of each received message, determining, by the first Wi-Fi device, a second Wi-Fi device that is manufactured by the same manufacturer as the first Wi-Fi device and is capable of supporting a requested service, establishing, by the first Wi-Fi device, a connection with the second Wi-Fi device through Wi-Fi Protected Setup (WPS) based on automatic provision, and sending, by the first Wi-Fi device, data associated with the requested service to the second Wi-Fi device for a Wi-Fi service.

In accordance with another aspect of the present invention, a system for providing Wi-Fi services is provided. The system includes at least one first Wi-Fi device for operating in AP mode and for sending a message to a second Wi-Fi device having a service information field containing device information, and the second Wi-Fi device for operating in non-AP mode and for determining a counterpart device that is capable of supporting a requested Wi-Fi service with reference to the service information field of the message received from the at least one first Wi-Fi device.

In accordance with aspects of the present invention, a Wi-Fi service method and system for Wi-Fi devices are provided. The system includes Wi-Fi devices for exchanging information on supported functions with each other, and one Wi-Fi device for identifying functions supported by another Wi-Fi device. Hence, in connecting Wi-Fi devices, automatic provision is possible between Wi-Fi devices without user intervention. In response to invocation of a Wi-Fi based application, one Wi-Fi device may rapidly select another Wi-Fi device capable of supporting the function of the executed application, enhancing user convenience. Accordingly, cumbersome user manipulation in connecting Wi-Fi devices is reduced, and effectiveness and convenience in utilizing Wi-Fi devices can be enhanced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 10A and 10B illustrate an information table according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to automatic provision between Wireless-Fidelity (Wi-Fi) devices. In one exemplary embodiment, it is possible to extend the functionality of Wi-Fi Protected Setup (WPS), which enables Wi-Fi devices to set up a secure wireless connection without complicated settings. That is, currently, a user actuates a specific button or enters a given Personal Identification Number (PIN) code to establish a connection between Wi-Fi devices using the WPS functionality. Exemplary embodiments of the present invention enable automatic provision of the WPS functionality without user intervention. To achieve this, a system and control method for the same are provided that enable one Wi-Fi device to identify functions supported by other Wi-Fi devices by allowing Wi-Fi devices to exchange information on supported functions with each other. Thereby, Wi-Fi services may be delivered in an easier and more convenient manner.

Next, a description is given of the configuration and operation of Wi-Fi devices in connection with FIGS. 1 to 10B. However, the configuration and operation thereof are not limited to or by the following description, and various changes and modifications are possible on the basis of the following description.

Figure 1:
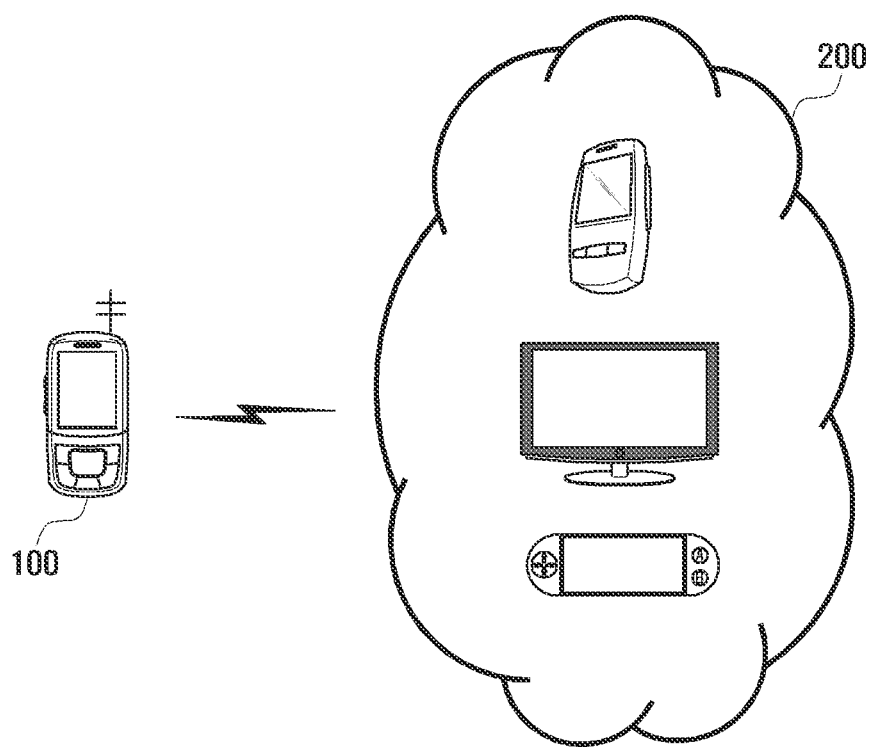
FIG. 1 illustrates a system of Wireless-Fidelity (Wi-Fi) devices according to an exemplary embodiment of the present invention.

FIG. 1 illustrates a system of Wi-Fi devices according to an exemplary embodiment of the present invention.

Referring to FIG. 1, the system includes a Wi-Fi device 100 acting as a sender (referred to as a "sending device") and at least one Wi-Fi device 200 acting as a receiver (referred to as a "receiving device"). Sending and receiving devices are distinguished only for convenience of description. Multiple receiving devices may be included in the system. For example, various electronic appliances having a Wi-Fi module such as a music player, display apparatus, portable gaming console and printer may act as receiving devices 200. One or more such electronic appliances may be used as receiving devices 200 in the following description.

As illustrated in FIG. 1, in the Wi-Fi based system of an exemplary embodiment of the present invention, the sending device 100 and the receiving device 200 support Wi-Fi Direct and may be directly interconnected in Direct Access (DA) mode. That is, the sending device 100 and the receiving devices 200 are Wi-Fi Direct devices. Wi-Fi Direct devices in the vicinity of each other may be directly connected to each other using Wi-Fi modules in DA mode without using an Access Point (AP).

The Wi-Fi devices 100 and 200 may exchange information on supported functions with each other. For example, to execute a Wi-Fi based application, the sending device 100 may examine information on supported functions delivered by the receiving devices 200, determine one of the receiving devices 200 optimally supporting the service of the Wi-Fi based application, and send data associated with the Wi-Fi based application to the determined receiving device 200. Hence, a sending device 100 may run a Wi-Fi based application through a receiving device 200. Such information exchange and control are described in more detail further below with reference to the drawings.

Although the Wi-Fi devices 100 and 200 are depicted as being connected with each other in DA mode in FIG. 1, they are not limited thereto. That is, the Wi-Fi devices 100 and 200 may also be connected through a WLAN or an AP.

For example, the Wi-Fi devices 100 and 200 in a hotspot may access the Internet via an AP and a relay (like a router). The Wi-Fi devices 100 and 200 in a region without an AP may access the Internet via a mobile communication network. The Wi-Fi devices 100 and 200 may be interconnected through an AP to exchange data when DA mode connection is not easily made.

Figures 2, 3:
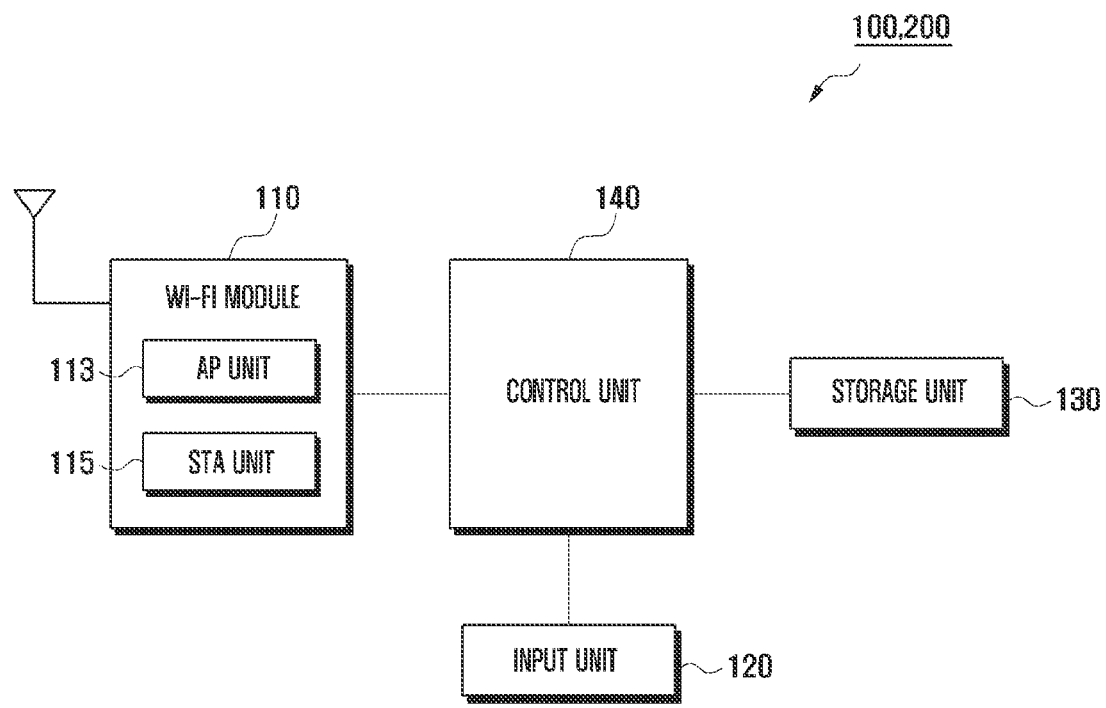
FIG. 2 is a block diagram of a Wi-Fi device in the system of FIG. 1 according to an exemplary embodiment of the present invention.
FIG. 3 illustrates a format of messages used to exchange information on functions supported by Wi-Fi devices according to an exemplary embodiment of the present invention.

FIG. 2 is a block diagram of a Wi-Fi device in the system of FIG. 1 according to an exemplary embodiment of the present invention. A sending device 100 and a receiving device 200 of FIG. 1 may have the same configuration.

Referring to FIG. 2, the Wi-Fi device includes a Wi-Fi module 110, an input unit 120, a storage unit 130, and a control unit 140. Although not shown, according to type, the Wi-Fi device may further include various components, such as a display unit for screen data display, a radio frequency unit for mobile communication, an audio processing unit including a microphone and a speaker, a camera module for taking photographs, a digital broadcast receiving module for Digital Multimedia Broadcasting (DMB) or Digital Video Broadcasting (DVB), and a Bluetooth module for Bluetooth communication. These additional components are not described further for conciseness in explanation.

The Wi-Fi module 110 supports Internet Protocol (IP) based wireless communication for the Wi-Fi device. In particular, the Wi-Fi module 110 includes an AP unit 113 and a station (STA) unit 115. Under control of the control unit 140, the Wi-Fi module 110 may wake up the AP unit 113 to operate in AP mode or wake up the STA unit 115 to operate in non-AP mode (i.e., STA mode). In non-AP mode (STA mode), a Wi-Fi device operates as a regular device. For example, in FIG. 1, the sending device 100 operates in non-AP mode. In AP mode, a Wi-Fi device operates as an AP. For example, in FIG. 1, the receiving device 200 operates in AP mode. In the description, AP mode and non-AP mode (i.e., STA mode) are distinguished for convenience of description.

In AP mode, the Wi-Fi module 110 sends information on functions supported by the Wi-Fi device under control of the control unit 140. For example, in AP mode, the Wi-Fi module 110 may periodically broadcast a beacon message containing information on supported functions through the AP unit 113. The Wi-Fi module 110 may receive a probe request message from another Wi-Fi device operating in non-AP mode (like the sending device 100 in FIG. 1), forward the received message to the control unit 140, and send a probe response message containing information on supported functions provided by the control unit 140 to the requesting Wi-Fi device through the AP unit 113.

In non-AP mode, the Wi-Fi module 110 may send a probe request message to another Wi-Fi device operating in AP mode (like a receiving device 200 in FIG. 1) through the STA unit 115, and may receive a beacon message or probe response message containing information on supported functions from another Wi-Fi device operating in AP mode through the STA unit 115 and forward the received message to the control unit 140. The Wi-Fi module 110 may also send and receive an automatic provision request message and an automatic provision response message, which are described further below.

Transmission and reception of the beacon message, probe request message, probe response message, automatic provision request message and automatic provision response message are described further below in relation to operation control.

The input unit 120 generates an input signal corresponding to a user action and sends the input signal to the control unit 140. The input unit 120 may include a plurality of buttons. In particular, the input unit 120 may include one or more buttons for generating an input signal to execute a Wi-Fi based function such as a WPS feature for connection setup between Wi-Fi devices.

The storage unit 130 stores various programs and data for the Wi-Fi device, and may be composed of one or more volatile memories and nonvolatile memories. For example, the storage unit 130 may store an operating system of the Wi-Fi device, a program and data for controlling AP mode operation of the Wi-Fi module 110, a program and data for controlling non-AP mode operation of the Wi-Fi module 110, a program and data for controlling automatic provision of the Wi-Fi device and a program and data for controlling exchange of information on supported functions. Such programs and data may be stored semi-permanently or temporarily. In particular, the storage unit 130 may store an information table to provide information on functions supported by the Wi-Fi device. The information table may be composed as in FIGS. 10A and 10B.

FIGS. 10A and 10B illustrate an information table according to an exemplary embodiment of the present invention.

Referring to FIGS. 10A and 10B, the information table includes a category field indicting the category (for example, telephone, computer, printer and the like) of a Wi-Fi device, an Identification (ID) value field identifying a given category (for example, telephone), a sub-category field indicating the level of the function and capability (for example, Windows Mobile, Phone—single mode, Phone—dual mode and the like) of a Wi-Fi device in a given category (for example, telephone), and another ID value field identifying a given sub-category.

According to the type of Wi-Fi device, the information table may be composed of a category (for example, telephone), an ID value of the category, a sub-category and an ID value of the sub-category. For example, when a Wi-Fi device belongs to the "Telephone" category, the Wi-Fi device may have an information table in the form of Table 1 obtained by extracting the "Telephone" category from FIGS. 10A and 10B. The ID value of the sub-category in Table 1 may be varied according to the capabilities of the Wi-Fi device.

TABLE 1

| Category | ID Value | Sub Category | ID Value |
|---|---|---|---|
| Telephone | 10 | Windows Mobile | 1 |
| | | Phone - single mode | 2 |
| | | Phone - dual mode | 3 |
| | | Smartphone - single mode | 4 |
| | | Smartphone - dual mode | 5 |

The control unit 140 controls the overall operation of the Wi-Fi device. More particularly, the control unit 140 controls an operation to provide Wi-Fi based services. The control unit 140 controls automatic execution of a WPS function for the Wi-Fi device. For example, the control unit 140 may control execution of a WPS function through automatic provision. The control unit 140 may control operation of the Wi-Fi module 110 according to a preset period. For example, the control unit 140 may wake up the AP unit 113 or the STA unit 115 of the Wi-Fi module 110 at regular intervals.

The control unit 140 controls AP mode operation and non-AP mode operation of the Wi-Fi device. For example, when the Wi-Fi device operates in AP mode, the control unit 140 may control the Wi-Fi module 110 to broadcast a beacon message containing information on the manufacturer, functions and capabilities of the Wi-Fi device at each beacon interval. When a probe request message is received from a second Wi-Fi device operating in non-AP mode while the Wi-Fi device operates in AP mode, the control unit 140 may control the Wi-Fi module 110 to send a probe response message containing information on the manufacturer, functions and capabilities of the Wi-Fi device to the second Wi-Fi device.

When the Wi-Fi device operates in non-AP mode (STA mode), the control unit 140 may control the Wi-Fi module 110 to receive a beacon message or a probe response message from a second Wi-Fi device and examine device information contained in the received message to identify functions and capabilities of the second Wi-Fi device. In particular, to execute a Wi-Fi based application, the control unit 140 may refer to device information collected from other Wi-Fi devices, select a counterpart Wi-Fi device best matching the application to be run, and cooperate with the counterpart Wi-Fi device to execute the application realizing a Wi-Fi service. For example, in response to invocation of an application related to video playback, the control unit 140 may select a counterpart Wi-Fi device having a video output function on the basis of pre-collected device information and send video data to the counterpart Wi-Fi device, which then plays back the video data.

After determining the counterpart Wi-Fi device, the control unit 140 may control connection setup through transmission and reception of an automatic provision request message and an automatic provision response message. For example, when the Wi-Fi device operates in non-AP mode, the control unit 140 may control an operation to send an automatic provision request message indicating button or PIN code input for the WPS function to the counterpart Wi-Fi device. When an automatic provision request message is received while the Wi-Fi device operates in AP mode, the control unit 140 may control an operation to automatically enter the button or PIN code as indicated by the received message for the WPS function and to send an automatic provision response message to the counterpart Wi-Fi device. As described above, on the basis of device information delivered in advance by beacon messages or probe response messages, Wi-Fi devices manufactured by the same manufacturer may send and receive an automatic provision request message and an automatic provision response message. That is, Wi-Fi devices manufactured by the same manufacturer may perform automatic connection setup for the WPS function by exchanging the automatic provision request message and automatic provision response message.

The role of the control unit 140 is described further in relation to operation control. In addition, the control unit 140 may control regular operations of the Wi-Fi device. For example, when an application using mobile communication is executed, the control unit 140 may control operations related to mobile communication. When an application using a local network is executed, the control unit 140 may control operations related to local networking.

The Wi-Fi device of an exemplary embodiment of the present invention may be any form of information and communication appliance, such as a mobile communication terminal supporting a communication protocol for a communication system, a smart phone, a Portable Multimedia Player (PMP), a digital broadcast receiver, a Personal Digital Assistant (PDA), a music player such as a Moving Picture Experts Group (MPEG)-1 or MPEG-2 audio layer 3 (MP3) player or a portable game console. The Wi-Fi device of an exemplary embodiment of the present invention may be applied to medium to large sized devices such as a television set, a large format display, digital signage, a media kiosk, a personal computer, a laptop computer, a printer, a multifunction office machine, etc.

FIG. 3 illustrates the format of messages used to exchange information on functions supported by Wi-Fi devices according to an exemplary embodiment of the present invention.

Referring to FIG. 3, the beacon message and probe response message described above include an Organizationally Unique Identifier (OUI) field 301, a length (LEN) field 303, an ID field 305, a Version (VER) field 307, a Type field 309, a Value field 311, and a "Service Protocol Type" field 313. In the description, the format of a probe response message is illustrated.

The OUI field 301 is a field used to indicate device information. The OUI field 301 stores information indicating a specific manufacturer (for example, Samsung Electronics has an OUI of "0000F0"). Each manufacturer has a unique OUI. More particularly, in addition to manufacturer information, the OUI field 301 may store information on functions and capabilities of a Wi-Fi device. The OUI field 301 may also be used to store service information requested by a Wi-Fi device. Using the OUI field 301, Wi-Fi devices manufactured by the same manufacturer may support the WPS function through automatic provision, and Wi-Fi devices may exchange information on supported functions with each other. Transmission and reception of messages having the OUI field 301 is described further below.

The LEN field 303 indicates the total length of the message (e.g., beacon or probe response message). The ID field 305 is used to prevent duplication of the OUI field value and the value thereof has yet to be defined. The VER field 307 is a field for extension and may be defined according to changes in Wi-Fi messages. The Type field 309 indicates the type of the beacon or response message. For example, type field values "0000", "0001", "0010" and "0011" indicate "resolved", "advertise", "WPS start request" and "WPS response", respectively.

The Value field 311 indicates the category and subcategory of a Wi-Fi device on the basis of the information table described above. The category and subcategory may indicate the functions and capabilities of a Wi-Fi device. For example, the Value field 311 may indicate that the Wi-Fi device is an audio player among audio devices. The categories and subcategories for the Value field 311 may be defined by classifying devices in advance.

The "Service Protocol Type" field 313 indicates the type of the wireless protocol carrying probe response messages. For example, field values "00000000", "00000001", "00000010", "00000011" and "11111111" indicate "All Service Protocol Type", "Bonjour", "UPnP", "WS-Discovery" and "Vendor Specific", respectively, and other values are reserved.

As described above, the beacon message and the probe response message may indicate the manufacturer of a Wi-Fi device using the OUI field 301, and indicate the functions and capabilities of a Wi-Fi device using the OUI field 301 and the Value field 311. Use of such messages is described further below.

A Wi-Fi device may scan other Wi-Fi devices in at least two ways. First, in passive scanning, a Wi-Fi device operating in non-AP mode receives a beacon message broadcast by another Wi-Fi device operating in AP mode. Such a beacon message may be periodically broadcast so as to indicate presence of a Wi-Fi device operating in AP mode in the vicinity and capabilities (for example, signal strength and bit rate) thereof. Hence, a Wi-Fi device operating in non-AP mode may create a list of Wi-Fi devices broadcasting beacon messages and obtain information on services and capabilities supported by the Wi-Fi devices. Such information may be used for network access through a Wi-Fi device operating in AP mode.

Second, in active scanning, a Wi-Fi device operating in non-AP mode sends a probe request message to another Wi-Fi device operating in AP mode. The probe request message may contain information on a service requested by the sender. Upon reception of the probe request message, the Wi-Fi device operating in AP mode sends a probe response message to the Wi-Fi device operating in non-AP mode. The probe response message may contain various information necessary for Wi-Fi direct access. Hence, a Wi-Fi device operating in non-AP mode may create a list of Wi-Fi devices on the basis of received probe response messages.

Next, a procedure based on passive scanning is described in connection with FIG. 4, and a procedure based on active scanning is described in connection with FIG. 5.

Figure 4:
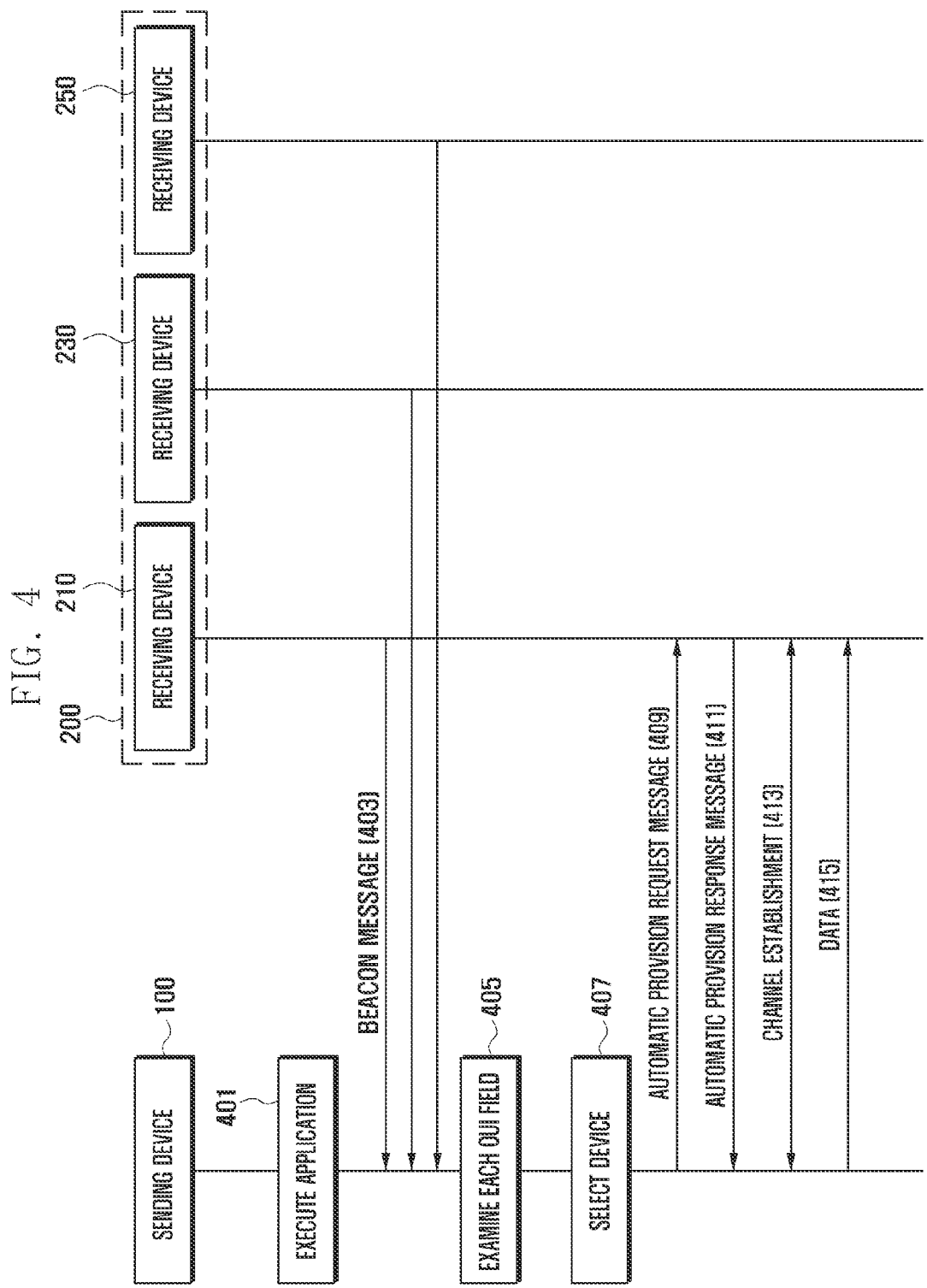
FIG. 4 is a sequence diagram depicting an example of interactions between Wi-Fi devices to provide a Wi-Fi based service according to an exemplary embodiment of the present invention.

FIG. 4 is a sequence diagram depicting an example of interactions between Wi-Fi devices to provide a Wi-Fi based service according to an exemplary embodiment of the present invention.

In FIG. 4, a sending device 100 corresponds to a Wi-Fi device operating in non-AP mode and receiving devices 200, including receiving device 210, receiving device 230, and receiving device 250, which each correspond to a Wi-Fi device operating in AP mode.

Referring to FIG. 4, the sending device 100 detects a user request for executing an application based on Wi-Fi in step 401. The sending device 100 may receive beacon messages broadcast from receiving devices 200 in the vicinity thereof in step 403. The receiving devices 200 may periodically broadcast beacon messages. Hence, in FIG. 4, beacon messages may be received before or after step 401 of application execution. As described above, a beacon message is periodically broadcast by a Wi-Fi device in AP mode, and another Wi-Fi device in non-AP mode may periodically receive the beacon message.

In an exemplary embodiment of the present invention, receiving devices 200 may broadcast a beacon message containing device information on the manufacturer, functions and capabilities in the OUI field. For example, assume that a receiving device 210 is a Wi-Fi device of an exemplary embodiment of the present invention and receiving devices 230 and 250 are not Wi-Fi devices of an exemplary embodiment of the present invention. The receiving device 210 may send a beacon message whose OUI field is set to device information and the receiving devices 230 and 250 may send a beacon message conforming to a corresponding standard. Receiving devices 200 may broadcast a beacon message containing category and subcategory information in the Value field.

After receiving beacon messages, the sending device 100 examines the OUI field of each beacon message to identify device information in step 405. The sending device 100 selects one of the receiving devices 200, which may be manufactured by the same manufacturer as the sending device 100 and capable of supporting the executed application, as a counterpart device (for example, receiving device 210) in step 407. For example, the sending device 100 may refer to the manufacturer and capability information collected from the OUI fields of the received beacon messages to select a counterpart device.

The sending device 100 sends an automatic provision request message to the counterpart device (receiving device 210) to set up a Wi-Fi connection with the receiving device 210 in step 409. In the description, the automatic provision request message refers to a message requesting automatic Wi-Fi connection setup between Wi-Fi devices manufactured by the same manufacturer in a preset manner according to OUI field information. The automatic provision request message may include an indication to a PIN code or push button for wireless encryption.

Upon reception of the automatic provision request message, the receiving device 210 sends an automatic provision response message as a reply to the sending device 100 in step 411. That is, the receiving device 210 may prepare connection setup for WPS function by entering a PIN code or push button indicated by the automatic provision request message, and send the automatic provision response message.

After exchange of the automatic provision request message and the automatic provision response message, the sending device 100 and the receiving device 210 establish a Wi-Fi communication channel in step 413.

After channel establishment, the sending device 100 sends data associated with the application to the receiving device 210 in step 415. For example, assume the sending device 100 attempts to execute an application related to video playback and the receiving device 210 is a display device capable of outputting screen data. Then, after channel establishment is completed between the sending device 100 and the receiving device 210 as described above, the sending device 100 may send video data to the receiving device 210 through the communication channel and the receiving device 210 may output the video data on the screen.

Figure 5:
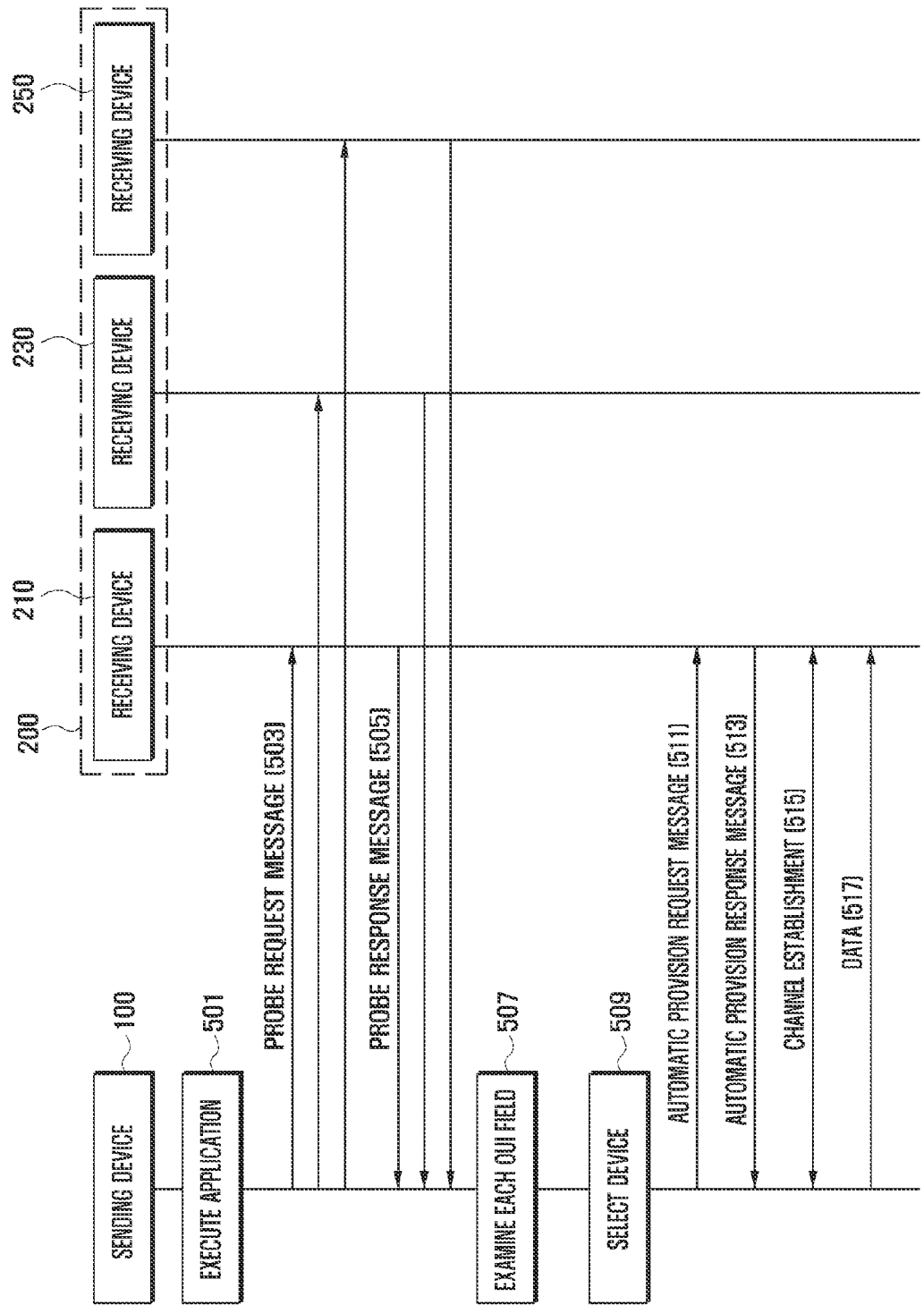
FIG. 5 is a sequence diagram depicting another example of interactions between Wi-Fi devices to provide a Wi-Fi based service according to an exemplary embodiment of the present invention.

FIG. 5 is a sequence diagram depicting another example of interactions between Wi-Fi devices to provide a Wi-Fi based service according to an exemplary embodiment of the present invention.

In FIG. 5, a sending device 100 corresponds to a Wi-Fi device operating in non-AP mode and receiving devices 200, including receiving device 210, receiving device 230, and receiving device 250, which each correspond to a Wi-Fi device operating in AP mode.

Referring to FIG. 5, the sending device 100 detects a user request for executing an application based on Wi-Fi in step 501. The sending device 100 broadcasts a probe request message to search for Wi-Fi devices in the vicinity thereof in step 503. In an exemplary embodiment of the present invention, the probe request message may contain information on a requested service (for example, application execution, or data processing, reproduction, output or storage).

Upon reception of the probe request message, one or more receiving devices 200 send a probe response message to the sending device 100 in step 505. In an exemplary embodiment of the present invention, a receiving device 200 may send a probe response message containing device information related to the manufacturer, functions and capabilities, or answer to the requested service in the OUI field. For example, assume that a receiving device 210 is a Wi-Fi device of an exemplary embodiment of the present invention and receiving devices 230 and 250 are not Wi-Fi devices of an exemplary embodiment of the present invention. The receiving device 210 may send a probe response message whose OUI field is set to device information and the receiving devices 230 and 250 may send a probe response message conforming to a corresponding standard. A receiving device 200 may send a probe response message containing category and subcategory information in the Value field.

After receiving probe response messages, the sending device 100 examines the OUI field of each probe response message to identify device information in step 507. The sending device 100 selects one of the receiving devices 200, which may be manufactured by the same manufacturer as the sending device 100 and is capable of supporting the executed application, as a counterpart device (for example, receiving device 210) on the basis of the device information collected from the OUI fields of the received probe response messages in step 509.

The sending device 100 sends an automatic provision request message to the counterpart device (receiving device 210) to set up a Wi-Fi connection with the receiving device 210 in step 511. In the description, the automatic provision request message refers to a message for requesting automatic Wi-Fi connection setup between Wi-Fi devices manufactured by the same manufacturer in a preset manner according to OUI field information. The automatic provision request message may include an indication to enter a PIN code or push a button for wireless encryption.

Upon reception of the automatic provision request message, the receiving device 210 sends an automatic provision response message as a reply to the sending device 100 in step 513. That is, the receiving device 210 may prepare connection setup for the WPS function by entering a PIN code or pushing a button indicated by the automatic provision request message, and send the automatic provision response message.

After exchange of the automatic provision request message and the automatic provision response message, the sending device 100 and the receiving device 210 establish a Wi-Fi communication channel in step 515.

After channel establishment, the sending device 100 sends data associated with the application to the receiving device 210 in step 517. For example, assume that the sending device 100 attempts to execute an application related to video playback and the receiving device 210 is a display device capable of outputting screen data. After channel establishment is completed between the sending device 100 and the receiving device 210 as described above, the sending device 100 may send video data to the receiving device 210 through the communication channel and the receiving device 210 may output the video data on the screen.

Figure 6:
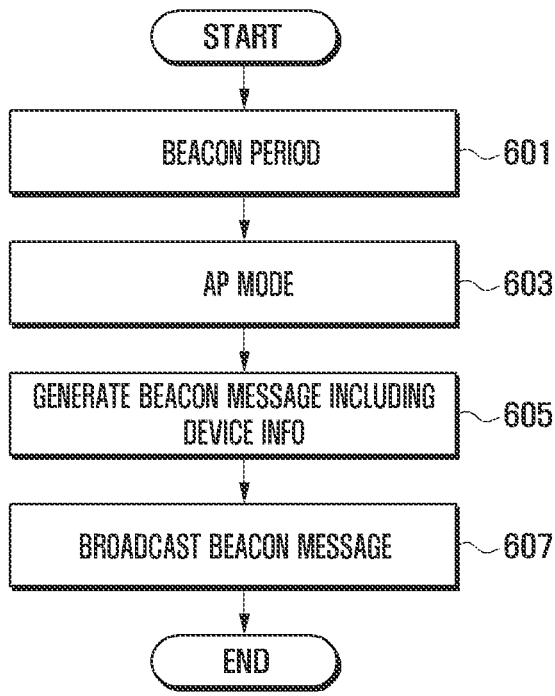
FIG. 6 is a flowchart of a procedure for broadcasting a beacon message performed by a Wi-Fi device according to an exemplary embodiment of the present invention.

FIG. 6 is a flowchart of a procedure for broadcasting a beacon message performed by a Wi-Fi device according to an exemplary embodiment of the present invention. In FIG. 6, the Wi-Fi device operates in AP mode (like the receiving device 210).

Referring to FIG. 6, when the beacon period arrives in step 601, the Wi-Fi device wakes up the Wi-Fi module 110 and activates the AP unit 113 to broadcast a beacon message in step 603. Here, the beacon message is a message sent by a Wi-Fi device operating in AP mode. The Wi-Fi device in AP mode periodically broadcasts a beacon message containing device information (for example, signal strength and bit rate) to advertise the presence of the Wi-Fi device. Other Wi-Fi devices receiving the beacon message may synchronize in time with the Wi-Fi device in AP mode and operate in power-saving mode. A Wi-Fi device in AP mode may periodically broadcast a beacon message at each beacon interval.

The Wi-Fi device generates a beacon message further containing device information of an exemplary embodiment of the present invention in step 605. As described above, the beacon message may include device information related to the manufacturer, functions and capabilities of the sender in the OUI field. Hence, using the manufacturer information in the OUI field, different Wi-Fi devices manufactured by the same manufacturer may support the WPS function based on automatic provision.

The Wi-Fi device broadcasts the generated beacon message to nearby Wi-Fi devices in step 607. As described above, the beacon message may be periodically broadcast at each beacon interval. Thereafter, the Wi-Fi device may establish a communication channel for the WPS function with a selected Wi-Fi device by exchanging an automatic provision request message and an automatic provision response message, and provide a Wi-Fi service.

Figure 7:
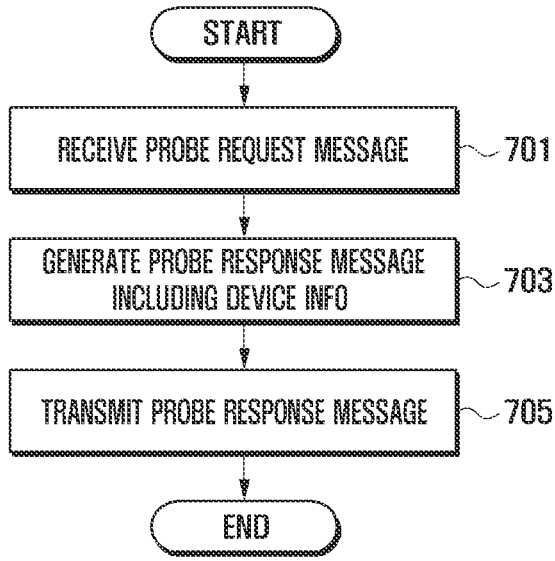
FIG. 7 is a flowchart of a procedure for sending a probe response message performed by a Wi-Fi device according to an exemplary embodiment of the present invention.

FIG. 7 is a flowchart of a procedure for sending a probe response message performed by a Wi-Fi device according to an exemplary embodiment of the present invention. In FIG. 7, the Wi-Fi device operates in AP mode (like the receiving device 210).

Referring to FIG. 7, the Wi-Fi device receives a probe request message from another Wi-Fi device, such as the sending device 100, operating in non-AP mode in step 701. The probe request message may include service information requested by the Wi-Fi device operating in non-AP mode.

Upon reception of the probe request message, the Wi-Fi device generates a probe response message further containing device information of an exemplary embodiment of the present invention in step 703. The probe response message may include various information required for Wi-Fi connection setup. In an exemplary embodiment of the present invention, as described above, the probe response message may further include device information related to the manufacturer, functions and capabilities of the sender in the OUI field. Hence, using the manufacturer information in the OUI field, different Wi-Fi devices manufactured by the same manufacturer may support the WPS function based on automatic provision. The probe response message may further include, in the OUI field, an answer to the service request indicated by the probe request message.

The Wi-Fi device sends the generated probe response message to the Wi-Fi device having sent the probe request message in step 705. Thereafter, the Wi-Fi device may establish a communication channel for the WPS function with the requesting Wi-Fi device by exchanging an automatic provision request message and an automatic provision response message, and provide a Wi-Fi service.

Figure 8:
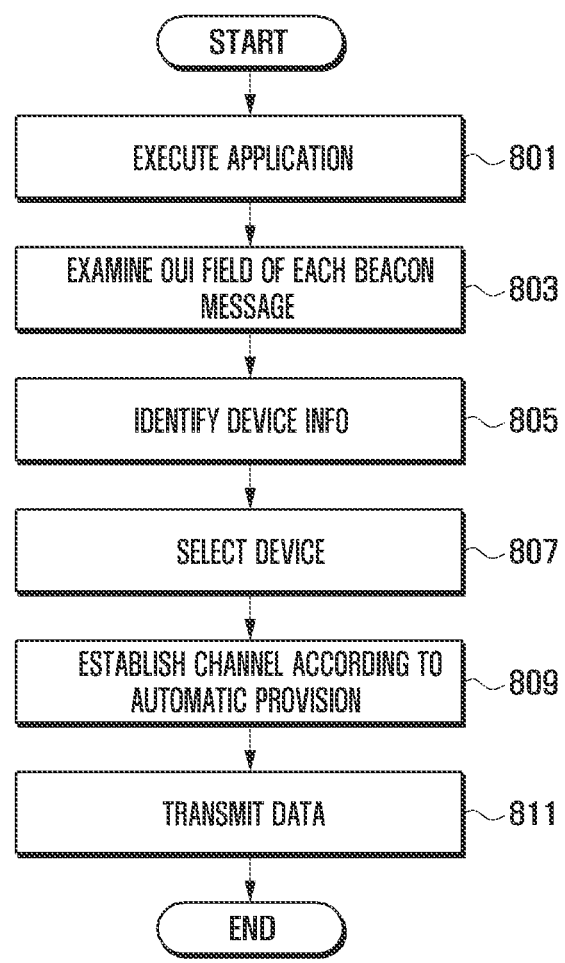
FIG. 8 is a flowchart of a Wi-Fi service method according to another exemplary embodiment of the present invention.

FIG. 8 is a flowchart of a Wi-Fi service method according to another exemplary embodiment of the present invention. In FIG. 8, a Wi-Fi device carrying out the method operates in non-AP mode as the sending device 100.

Referring to FIG. 8, when the control unit 140 of the Wi-Fi device detects a user request for executing an application based on Wi-Fi in step 801, it examines the OUI fields of beacon messages received from other Wi-Fi devices in the vicinity thereof in step 803. As described above, the Wi-Fi device may receive beacon messages periodically broadcast by other Wi-Fi devices in the vicinity thereof.

The control unit 140 identifies device information in the OUI fields of the received beacon messages in step 805. The control unit 140 selects one of the nearby Wi-Fi devices, which may be manufactured by the same manufacturer as the present Wi-Fi device and is capable of supporting the executed application, as a counterpart device in step 807. For example, when the executed application is associated with Wi-Fi based video data output, the control unit 140 may determine a nearby Wi-Fi device that may be manufactured by the same manufacturer as the present Wi-Fi device and is capable of outputting video data as a counterpart device on the basis of device information in the OUI fields.

The control unit 140 establishes a channel for a Wi-Fi connection with the counterpart device according to automatic provision in step 809, and sends data associated with the application to the counterpart device in step 811. For example, the control unit 140 may send an automatic provision request message containing an indication to a PIN code or push button for the WPS function to the counterpart device, receive an automatic provision response message as a reply from the counterpart device, set up a Wi-Fi connection with the counterpart device, and send data through the Wi-Fi connection.

Figure 9:
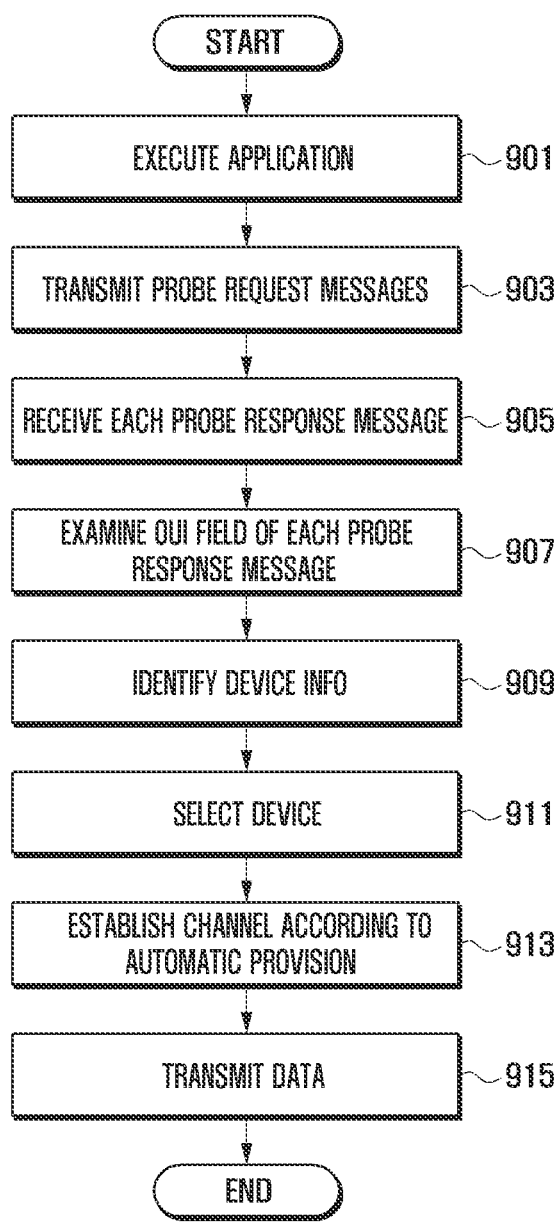
FIG. 9 is a flowchart of another Wi-Fi service method according to another exemplary embodiment of the present invention.

FIG. 9 is a flowchart of another Wi-Fi service method according to another exemplary embodiment of the present invention.

In FIG. 9, a Wi-Fi device carrying out the method operates in non-AP mode (STA mode) as the sending device 100.

Referring to FIG. 9, when the control unit 140 of the Wi-Fi device detects a user request for executing an application based on Wi-Fi in step 901, it broadcasts a probe request message to search for Wi-Fi devices in the vicinity thereof in step 903. In an exemplary embodiment of the present invention, the probe request message may contain information on a requested service (for example, application execution, or data processing, reproduction, output or storage).

Thereafter, the control unit 140 receives probe response messages from nearby Wi-Fi devices having received the probe request message in step 905. As described above, the probe response message may contain device information related to the manufacturer, functions and capabilities, or answer to the requested service in the OUI field.

After receiving probe response messages, the control unit 140 examines the OUI field of each probe response message in step 907 and identifies device information in the OUI field in step 909. Using the identified device information, the control unit 140 selects a nearby Wi-Fi device, which may be manufactured by the same manufacturer as the present device and is capable of supporting the executed application, as a counterpart device in step 911. For example, when the executed application is associated with Wi-Fi based video data output, the control unit 140 may determine a nearby Wi-Fi device that may be manufactured by the same manufacturer as the present Wi-Fi device and is capable of outputting video data as a counterpart device on the basis of device information in the OUI fields of the received probe response messages.

After determining the counterpart device, the control unit 140 establishes a channel for a Wi-Fi connection with the counterpart device according to automatic provision in step 913, and sends data associated with the application to the counterpart device in step 915. For example, the control unit 140 may send an automatic provision request message containing an indication to a PIN code or push button for the WPS function to the counterpart device, receive an automatic provision response message as a reply from the counterpart device, set up a Wi-Fi connection with the counterpart device, and send data through the Wi-Fi connection.

The method for providing Wi-Fi services of exemplary embodiments of the present invention may be implemented as computer programs for execution via one or more computers and may be stored in various computer readable storage media. The computer readable storage media may store program instructions, data files, data structures and combinations thereof. The program instructions may include instructions developed specifically for the an exemplary embodiments of the present invention and existing general-purpose instructions.

The computer readable storage media may include magnetic media such as a hard disk and floppy disk, optical media such as a Compact Disc Read-Only Memory (CD-ROM) and Digital Versatile Disc (DVD), magneto-optical media such as a floptical disk, and memory devices such as a Read-Only Memory (ROM) and Random-Access Memory (RAM). The program instructions may include machine codes produced by compilers and high-level language codes executable through interpreters.

The description of the various embodiments is to be construed as exemplary only and does not describe every possible instance of the invention. Therefore, it should be understood that various changes may be made and equivalents may be substituted for elements of the invention.

While the invention has been shown and described reference to certain exemplary embodiments thereof, it will be understood by those skilled in the art that various changes in form and details may be made therein without departing from the spirit and scope of the invention as defined in the appended claims and their equivalents.

What is claimed is:

1. A method for providing Wireless-Fidelity (Wi-Fi) services, the method comprising:
   executing, by a first Wi-Fi device in non-Access Point (AP) mode, an application;
   receiving, by the first Wi-Fi device, messages comprising one of a beacon message or a probe response message from Wi-Fi devices operating in AP mode, each received message comprising information related to an organizationally unique identifier (OUI) and a value field indicating a category and a subcategory of the Wi-Fi devices;
   identifying, by the first Wi-Fi device, at least one Wi-Fi device, from among the Wi-Fi devices operating in AP mode, that is manufactured by the same manufacturer as the first Wi-Fi device based on the OUI of each of the received messages;
   determining, by the first Wi-Fi device, which Wi-Fi device, from among the identified at least one Wi-Fi device, is capable of supporting the Wi-Fi service associated with the executed application based on the category and subcategory of each of the received messages;
   transmitting, by the first Wi-Fi device, an automatic provision request message including information associated with at least one of a personal identification number (PIN) code and push button for a Wi-Fi Protected Setup (WPS) to the determined Wi-Fi device;
   establishing, by the first Wi-Fi device, a connection with the determined Wi-Fi device through the Wi-Fi Protected Setup (WPS) if receiving, from the determined Wi-Fi device, an automatic provision response message in response to the automatic provision request message; and
   sending, by the first Wi-Fi device, data associated with the executed application to the determined Wi-Fi device using the Wi-Fi service.

2. The method of claim 1, wherein, in the receiving of the messages from the Wi-Fi devices, the messages correspond to one of beacon messages periodically broadcast by the Wi-Fi devices and probe response messages sent by the Wi-Fi devices in reply to a request message from the first Wi-Fi device.

3. The method of claim 2, wherein the beacon messages and the probe response messages comprise a service information field containing device information related to at least one of the manufacturer, functions and capabilities of a Wi-Fi device.

4. The method of claim 1, wherein the automatic provision request message includes a request for WPS activation to the determined Wi-Fi device through the automatic provisioning according to a preset rule.

5. The method of claim 1, wherein the identifying, by the first Wi-Fi device, of which Wi-Fi device is capable of supporting the Wi-Fi service associated with the executed application based on the category and subcategory value of each of the received messages comprises identifying the Wi-Fi device that best matches the Wi-Fi service.

6. A Wireless-Fidelity (Wi-Fi) device for providing Wi-Fi services, the Wi-Fi device comprising:
   a transceiver configured to communicate with Wi-Fi devices operating in an Access Point (AP) mode; and
   a processor configured to:
   execute in a non-AP mode an application;
   receive messages comprising a beacon message or a probe response message from the Wi-Fi devices operating in the AP mode, each received message comprising information related to an organizationally unique identifier (OUI) and a value field indicating a category and a subcategory of the Wi-Fi devices;
   identify at least one Wi-Fi device, from among the Wi-Fi devices operating in the AP mode, that is manufactured by the same manufacturer based on the OUI of each of the received messages;
   determine which Wi-Fi device, from among the identified at least one Wi-Fi device, is capable of supporting the Wi-Fi service associated with the executed application based on the category and subcategory value of each of the received messages;
   transmit an automatic provision request message, including information associated with at least one of a personal identification number (PIN) code and push button for a Wi-Fi Protected Setup (WPS) to the determined Wi-Fi device;
   establish a connection with the determined Wi-Fi device through the Wi-Fi Protected Setup (WPS) if receiving, from the determined Wi-Fi device, an automatic provision response message in response to the automatic provision request message; and
   send data associated with the executed application to the determined Wi-Fi device using the Wi-Fi service.

7. The Wi-Fi device of claim 6, wherein the determined Wi-Fi device is at least one counterpart device that best matches the Wi-Fi service.

8. The Wi-Fi device of claim 6, wherein the beacon message and the probe response message have a service information field containing device information related to at least one of the manufacturer, functions, and capabilities of a Wi-Fi device.

9. The Wi-Fi device of claim 8, wherein the beacon message that has the service information field containing device information according to a preset beacon interval is periodically broadcasted by the Wi-Fi devices operating in the AP mode.

10. The Wi-Fi device of claim 8, wherein the probe response message that has the service information field containing the device information in reply to a probe request message containing information on a requested service is sent from the Wi-Fi devices operating in the AP mode.

11. The Wi-Fi device of claim 6, wherein the automatic provision request message includes a request for WPS activation to the determined Wi-Fi device through the automatic provisioning according to a preset rule.

* * * * *